(12) United States Patent
Mantin et al.

(10) Patent No.: US 11,683,294 B2
(45) Date of Patent: Jun. 20, 2023

(54) PRIVACY-PRESERVING LEARNING OF WEB TRAFFIC

(71) Applicant: Imperva, Inc., San Mateo, CA (US)

(72) Inventors: Itsik Mantin, Shoham (IL); Shelly Hershkovitz, Tel Aviv (IL); Amichai Shulman, Tel Aviv (IL); Nitzan Niv, Nesher (IL)

(73) Assignee: IMPERVA, INC., San Mateo, CA (US)

( * ) Notice: Subject to any disclaimer, the term of this patent is extended or adjusted under 35 U.S.C. 154(b) by 182 days.

(21) Appl. No.: 16/730,989

(22) Filed: Dec. 30, 2019

(65) Prior Publication Data

US 2021/0203642 A1 Jul. 1, 2021

(51) Int. Cl.
*H04L 9/40* (2022.01)
*H04L 9/06* (2006.01)
*H04L 101/695* (2022.01)

(52) U.S. Cl.
CPC ........ *H04L 63/0281* (2013.01); *H04L 9/0631* (2013.01); *H04L 2101/695* (2022.05); *H04L 2209/046* (2013.01)

(58) Field of Classification Search
CPC .............. H04L 63/0281; H04L 9/0631; H04L 61/6095; H04L 2209/046; H04L 61/301; H04L 61/307; H04L 63/168; H04L 63/166; H04L 63/0245; H04L 63/1408; H04L 63/1441
See application file for complete search history.

(56) References Cited

U.S. PATENT DOCUMENTS

| | | | | |
|---|---|---|---|---|
| 8,060,414 | B1* | 11/2011 | Lin | G06Q 30/0601 705/26.1 |
| 8,711,733 | B2* | 4/2014 | Axell | H04L 65/1083 370/259 |
| 9,760,737 | B2* | 9/2017 | Cammarota | H04L 9/3278 |
| 9,892,184 | B1* | 2/2018 | VanDeBurg | G06F 21/6218 |
| 10,277,586 | B1* | 4/2019 | Yau | H04L 63/0807 |
| 11,106,821 | B2* | 8/2021 | Roake | H04L 9/0618 |
| 11,144,513 | B1* | 10/2021 | Padisetty | G06F 16/122 |
| 11,201,855 | B1* | 12/2021 | Kondamuri | H04L 63/0263 |
| 2002/0091745 | A1* | 7/2002 | Ramamurthy | H04L 61/4523 707/E17.112 |
| 2002/0091798 | A1* | 7/2002 | Joshi | H04L 67/02 707/E17.112 |

(Continued)

*Primary Examiner* — David Garcia Cervetti
(74) *Attorney, Agent, or Firm* — Nicholson, De Vos, Webster & Elliott, LLP

(57) ABSTRACT

A method by one or more network devices communicatively coupled to a web application layer proxy for profiling parameters of web application layer requests received by the web application layer proxy while preserving privacy. The method includes obtaining masked parameter values associated with a parameter in the web application layer requests, where the masked parameter values associated with the parameter are generated by the web application layer proxy based on masking parameter values associated with the parameter while preserving lengths of the parameter values associated with the parameter and character types of characters in the parameter values associated with the parameter, generating the profile of the parameter based on analyzing the masked parameter values associated with the parameter, and providing the profile of the parameter to the web application layer proxy.

20 Claims, 7 Drawing Sheets

(56) References Cited

U.S. PATENT DOCUMENTS

| | | | | |
|---|---|---|---|---|
| 2002/0099671 A1* | 7/2002 | Mastin Crosbie | ...... | G06F 21/62 707/E17.112 |
| 2002/0112155 A1* | 8/2002 | Martherus | ............. | H04L 63/083 713/155 |
| 2002/0112185 A1* | 8/2002 | Hodges | ................ | H04L 63/105 709/224 |
| 2006/0021054 A1* | 1/2006 | Costa | .................... | G06F 21/566 726/25 |
| 2006/0031933 A1* | 2/2006 | Costa | .................... | G06F 21/552 726/22 |
| 2007/0136809 A1* | 6/2007 | Kim | ...................... | G06F 21/552 726/13 |
| 2010/0131585 A1* | 5/2010 | Rodrigue | ................ | H04L 67/02 709/231 |
| 2014/0059357 A1* | 2/2014 | Andersson | ........... | G06F 21/602 713/189 |
| 2014/0096259 A1* | 4/2014 | Segal | ..................... | G06F 21/42 726/26 |
| 2014/0189681 A1* | 7/2014 | Bryan | ..................... | H04L 63/20 717/176 |
| 2014/0281535 A1* | 9/2014 | Kane | .................. | G06F 21/6209 713/168 |
| 2015/0089623 A1* | 3/2015 | Sondhi | .................. | H04L 63/205 726/9 |
| 2016/0132692 A1* | 5/2016 | Kerschbaum | ....... | G06F 21/6227 713/189 |
| 2016/0182517 A1* | 6/2016 | Sullivan | .................... | H04L 9/14 713/171 |
| 2016/0232553 A1* | 8/2016 | Reddy K | ........... | G06Q 30/0225 |
| 2016/0315841 A1* | 10/2016 | Kang | .................... | H04L 47/283 |
| 2016/0359945 A1* | 12/2016 | Boudville | ............ | H04L 67/131 |
| 2017/0124335 A1* | 5/2017 | Freudiger | ........... | G06F 21/6254 |
| 2017/0153938 A1* | 6/2017 | Liu | ..................... | G06F 11/0793 |
| 2017/0187818 A1* | 6/2017 | Haswell | ............... | H04L 67/51 |
| 2018/0013547 A1* | 1/2018 | Giura | ............... | H04L 63/1408 |
| 2018/0190284 A1* | 7/2018 | Singh | ...................... | G10L 15/30 |
| 2018/0239682 A1* | 8/2018 | Kaluza | ............... | G06F 11/3006 |
| 2018/0316491 A1* | 11/2018 | Pivovarov | ............... | G06F 7/588 |
| 2018/0363937 A1* | 12/2018 | Nagasaka | ................ | H04Q 9/00 |
| 2019/0050577 A1* | 2/2019 | Kulagin | ............. | G06F 9/44505 |
| 2019/0068747 A1* | 2/2019 | Lervik | .................. | H04L 67/535 |
| 2019/0208489 A1* | 7/2019 | Yang | ...................... | H04L 12/66 |
| 2019/0260730 A1* | 8/2019 | Mainali | ............... | H04L 63/083 |
| 2020/0012784 A1* | 1/2020 | Orihara | ............... | H04L 63/1425 |
| 2020/0167478 A1* | 5/2020 | Tammachi | ............. | H04L 63/20 |
| 2020/0252200 A1* | 8/2020 | Lin | ...................... | H04L 9/0637 |
| 2021/0019443 A1* | 1/2021 | Choi | ..................... | G06V 10/82 |

* cited by examiner

Cc Values

Cc = 1234123412341234
Cc = 4897760795884193
Cc = 4338391022095333
Cc = 4338391022095333
Cc = 4408070467218874
Cc = 4345076096144239
Cc = 4878381057877214
Cc = 4981000348637336
Cc = 4955384180170834
Cc = 4407480319642927

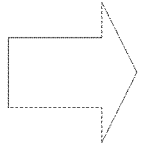

Aggregated and Shuffled Cc Values

3430738940450773194484643351234
36772135180030628908092422343340
23914934833973871444643294782058
78165187142924174703083348033040
99828219135004185486176478931437 0

Pwd Values

Pwd = mnzS2#@H$4
Pwd = bHmGu+zk7F?PuRYSq1
Pwd = BB*N~r38
Pwd = X389jYDE!uFg
Pwd = CV+b?~KtQzhk2
Pwd = $61F4~Aj
Pwd = mYPa$$word
Pwd = 5%?C4pMhKsb
Pwd = v9y3w=6T9*es!V6Tbj#
Pwd = n#tU5DVW

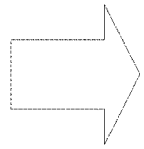

Aggregated and Shuffled Pwd Values

2Vu#v9W9B=jpXAQ1~dk$zDb4w~ratMC
S1m75jgbb#K*$r$C3#V?SFoRYY!8$84u
nyz~k43+n@umK2!HYFHs6ez?NG?sjtB
mUF+P636wPh*5q%9TDEhVbT

Mail Values

Mail = john.doe@domain.com
Mail = jane.doe@domain.com
Mail = surferjoe@email.com
Mail = coolcat@email.com
Mail = liam.oliver@company.com
Mail = charlotte@company.com
Mail = prince.w.82@email.com
Mail = santaclauseisreal@np.com
Mail = fake_email@email.com
Mail = email_me_2day@email.com

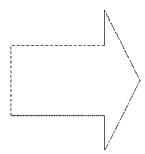

Aggregated and Shuffled Mail Values caaamoaipalmedrt.iecdirm.on_rlacmjr.le
plole2in.aean@ouie.mamoiolydn_oh2nd
o.hclm@.jcleac@mmc..nef_scmisoiicoo.
k@mem@omact@ememvaeeeotiacoma
@poeai..omaallammoestyjy8moeecoe.la
iolaac@cpcdun@wcrimcsrfomlomn.n.@ isAuth Values isAuth = TRUE
isAuth = FALSE
isAuth = FALSE
isAuth = TRUE
isAuth = TRUE
isAuth = TRUE
isAuth = FALSE
isAuth = TRUE
isAuth = FALSE
isAuth = FALSE

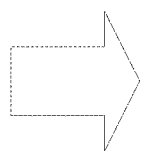

Aggregated and Shuffled isAuth Values

FLEESERTALRTFLFURUETFASTEELE
USTAFUSSEARUELREA

Figure 4

PRIVACY-PRESERVING LEARNING OF WEB TRAFFIC

TECHNICAL FIELD

Embodiments of the invention relate to the field of computer network security, and more specifically, to profiling parameters/attributes of web application layer traffic in a privacy-preserving manner.

BACKGROUND

The content of Hypertext Transfer Protocol (HTTP) messages is transmitted within the application layer ("Layer 7") of the Open Systems Interconnection (OSI) model (ISO/IEC 7498-1), and may also be referred to as web application layer data. The OSI model was developed to establish standardization for linking heterogeneous communication systems and describes the flow of information from a software application of a first computer system to a software application of a second computer system through a communications network. The OSI model has seven functional layers including a physical link layer, a data link layer, a network layer, a transport layer, a session layer, a presentation layer, and an application layer. A few examples of application layer protocols include, but are not limited to, HTTP for web application communication, File Transfer Protocol (FTP) for file transmission, Internet Message Access Protocol (IMAP) and Post Office Protocol (POP) for email, Simple Mail Transfer Protocol (SMTP) for transmitting email, Internet Relay Chat (IRC) for real-time Internet text messaging, Session Initiation Protocol (SIP) for voice and video calling, and Network File System (NFS) for the remote access of files.

Another model detailing communications on the Internet is known as the Internet Protocol (IP) suite and is sometimes referred to as "TCP/IP." In contrast to the OSI model, the Internet protocol suite is a set of communications protocols including four layers: a link layer, an internet layer, a transport layer, and an application layer. The link layer of the Internet protocol suite, which provides communication technologies for use in a local network, is often described as roughly analogous to a combination of the data link layer (layer 2) and physical layer (layer 1) of the OSI model. The internet layer (e.g., IP version 4 (IPv4) and IP version 6 (IPv6)) of the Internet protocol suite, which provides for inter-networking and thus connects various local networks, is often described as roughly analogous to the network layer (layer 3) of the OSI model. The transport layer (e.g., Transmission Control Protocol (TCP), User Datagram Protocol (UDP)) of the Internet protocol suite, which allows for host-to-host communications, is often described as roughly analogous to the transport layer (layer 4) of the OSI model. Finally, the application layer of the Internet protocol suite includes the various protocols (e.g., HTTP, IMAP, FTP, SIP) for data communications on a process-to-process level and is often described as analogous to a combination of the session, presentation, and application layers (layers 5-7, respectively) of the OSI model.

Regardless of the model considered, many common attacks are targeted at aspects of the network layer, the transport layer, and the application layer. The network layer, which is under the transport layer and routes data supplied by the transport layer, manages delivery of packets between computing devices that may be connected to different networks and separated by one or more other networks. The network layer is responsible for logical addressing, which includes managing mappings between IP addresses and computing devices on a worldwide basis. The network layer is also responsible for ensuring that packets sent to computing devices on different networks are able to successfully navigate through the various networks successfully and arrive at the proper intended destinations. Network devices such as routers and gateways predominantly operate at the network layer. The transport layer, which is under the application layer, provides end-to-end communication services by providing reliable delivery of an entire message from a source to a destination, sometimes using multiple packets. While the network layer typically handles each packet independently, the transport layer manages the relationships between the packets to ensure that the entire message arrives at the destination and can be reassembled in the correct order to recreate the original message. The application layer typically operates as the top layer in networking models and carries application-specific data, such as HTTP request and response messages.

Application layer attacks typically target web applications implemented by web application servers (in which case, they are referred to as web application layer attacks). A web application server is system software (running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., using HTTP), and may also include an application server that executes procedures (i.e., programs, routines, scripts) of a web application. Web applications are computer software applications made up of one or more files including computer code that run on top of web application servers and are written in a language the web application server supports. Web applications are typically designed to interact with web application clients by dynamically generating web application responses (e.g., HTTP response messages) responsive to web application requests (e.g., HTTP request messages) sent by those web application clients. Many web applications use databases (e.g., relational databases such as PostgreSQL, MySQL, and Oracle, and non-relational databases, also known as NoSQL databases, such as MongoDB, Riak, CouchDB, Apache Cassandra and HBase) to store information received from web application clients and/or information to be displayed to web application clients.

Web applications clients access web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients. The web application data/content may include, for example, public web pages (e.g., free content, store fronts, search services) and/or private web pages (e.g., username/password accessed web pages providing email services). Thus, web applications may be provided using a request-response protocol (e.g., HTTP) in a client-server computing model, where the web application servers typically act as the "server" and the web application clients typically act as the "client." By way of an operational example, a web application client may request a web page from a web application server by sending it an HTTP request message. For example, to access the web page corresponding to the Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

Many web applications use databases to store and provide data used by the web application, including but not limited to user data (passwords, user names, contact information, credit card information, web application history, etc.) and other site-specific data including but not limited to stories, comments, pictures, product information, sales information, financial records, and other types of information used by or displayed by a web application. Because these databases often store confidential or private information, the databases are often configured to only provide access to the data stored therein to a limited number of users, geographic locations, and/or computing devices.

However, due to the sensitive and important data in these databases, they are often targeted by third parties seeking unauthorized, and possibly malicious access. For example, attackers may attempt access data of a web application by performing a variety of attacks on the web application servers such as SQL Injection attacks, Remote Code Execution (RCE) attacks, Remote File Inclusion (RFI) attacks, Cross-Site Scripting (XSS) attacks, Cross-Site Request Forgery (CSRF) attacks, file upload attacks, backdoor communication attacks, Remote File Inclusion (RFI) attacks, and directory traversal attacks.

Given this reality, security devices such as web application layer proxies (e.g., web application firewalls) are commonly deployed to look for and prevent such attacks within web application layer traffic (e.g., HTTP traffic). For example, a web application layer proxy may be deployed in front of a web application server to examine traffic being sent to the web application server (e.g., on a packet-by-packet basis) using a set of security rules to detect attacks of certain attack types. Each security rule typically includes a rule identifier (ID), which serves to uniquely identify that particular rule. Each security rule also typically includes a set of one or more conditions that define what to look for in traffic and a set of one or more actions to be performed when the conditions are satisfied. A condition may be specified using one or more attributes. An attribute is a combination of an attribute identifier and a set of one or more attribute values. Attribute identifiers can identify particular protocol headers (e.g., a TCP header, an HTTP header) and/or header fields (e.g., a source or destination port of a TCP header and a Referer HTTP header field) used within a packet. Attribute identifiers can also identify metrics or characteristics of traffic that an attribute value represents. For example, an attribute identifier may be a number of packets or HTTP messages received over a defined period of time, and the corresponding attribute value may be that particular number of packets or HTTP messages. Of course, the use of metrics or characteristics as attribute identifiers requires that the system have some way of determining the attribute values, such as by maintaining a separate table or database with relevant data necessary to perform the computation. Attribute identifiers may also identify portions of application layer data carried by packets, such as an HTTP request message, an HTTP response message, a SQL query, etc. A condition may be specified as an exact match of an attribute value with a specific value or a set of values (e.g., look for blacklisted IP addresses), a pattern match of an attribute value against specific patterns (e.g., using regular expressions), and/or a deviation of an attribute value from a baseline (e.g., non-digit characters appearing in a field that was learned to be an integer type field).

As noted above, each security rule also includes one or more actions to be performed when the conditions of the security rule are satisfied (a security rule is said to be "triggered" when the condition of the security rule is satisfied). Actions can indicate one or more forwarding actions (e.g., drop the packet or message, temporarily hold the packet or message for further analysis, transmit the packet or message to a particular module or IP address, forward the packet or message to the intended destination, etc.) or modification actions (e.g., insert a value into the packet or message at a particular location, strip out a value from the packet or message, replace a value in the packet or message, etc.). Additionally, many other types of actions are well known to those of ordinary skill in the art (e.g., generate an alert to notify an administrator), and thus these examples are not exhaustive.

Thus, a web application layer proxy may sit in front of web application servers and examine the traffic being sent between the web application clients and the web application servers, including web application layer requests (e.g., HTTP request messages) sent by the web application clients to the web application servers, and can scan these requests for attacks (e.g., based on applying security rules).

If the web application layer proxy determines that the web application layer request includes an attack (e.g., because a security rule is triggered), then it can take the appropriate security measures (e.g., perform the actions specified by the security rule that was triggered). Otherwise, if the web application firewall determines that the web application layer request does not include an attack, then it may allow the web application layer request to proceed to the web application server that it is intended for.

A web application layer proxy may use a positive security model to detect attacks. A positive security model defines which traffic is allowed and blocks all other traffic. Positive security models have been proven effective against zero-day attacks (e.g., attacks that are unknown or yet to be addressed). Profiling web application layer traffic is an important aspect of generating an effective positive security model. A web application layer proxy may generate a profile of web application layer traffic that describes the expected content and behavior of the web application layer traffic and use the profile to detect traffic that deviates from the profile, which may indicate a possible attack.

In some cases, it makes sense for the profile of the web application layer traffic to be generated by a third-party vendor (e.g., as a Software as a Service (SaaS) in the cloud) instead of by the web application firewall itself. In these cases, the web application firewall needs to send data regarding the web application layer traffic it sees to the third-party vendor, which creates a conflict between the privacy of the web application owner and its users on one side and the third-party vendor that needs the most full and accurate data to enable effective profile generation on the other side.

Encryption techniques such as homomorphic encryption can be used to preserve privacy when sending data to third parties. However, encryption techniques are typically computationally intensive and can severely impact performance, which renders them impractical for many applications.

BRIEF DESCRIPTION OF THE DRAWINGS

The invention may best be understood by referring to the following description and accompanying drawings that are used to illustrate embodiments of the invention. In the drawings:

FIG. 3 is a diagram illustrating communications between the parameter profiler agent and the parameter profiler manager, according to some embodiments.

FIG. 4 is a diagram illustrating aggregated and shuffled parameter values, according to some embodiments.

DETAILED DESCRIPTION

Figure 1:
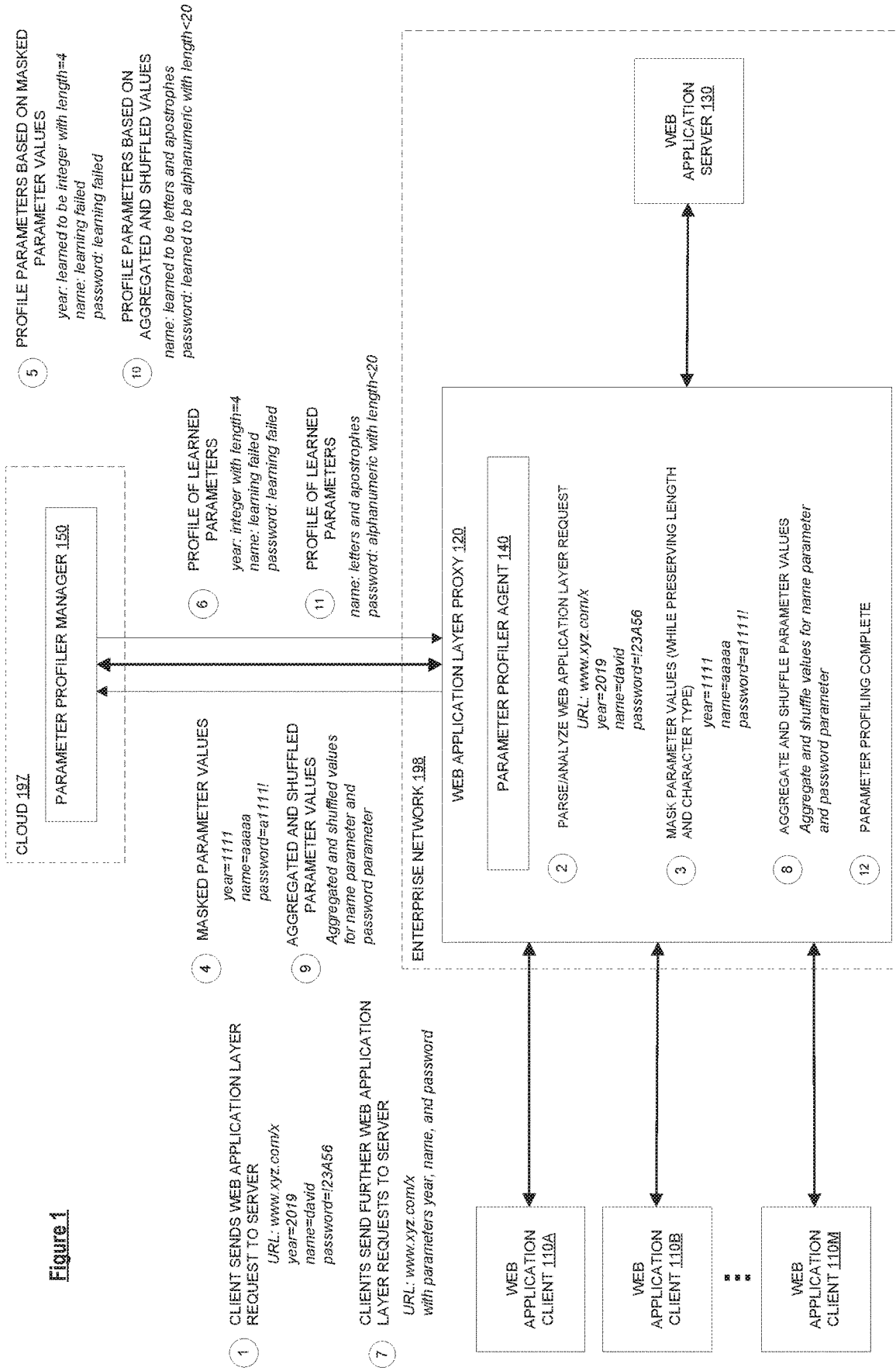
FIG. 1 is a block diagram of a system in which parameters of web application layer requests can be profiled in a privacy-preserving manner, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

As mentioned above, in some cases it makes sense for the profile of the web application layer traffic to be generated by a third-party vendor (e.g., as a Software as a Service (SaaS) in the cloud) instead of by the web application firewall itself. In these cases, the web application firewall needs to send data regarding the web application layer traffic it sees to the third-party vendor, which creates a conflict between the privacy of the web application owner and its users on one side and the third-party vendor that needs the most full and accurate data to enable effective profile generation on the other side. While encryption techniques such as homomorphic encryption can be used to preserve privacy when sending data to third parties, the use of such techniques are typically computationally intensive and can severely impact performance, which renders them impractical for many applications.

Embodiments disclosed herein provide methods, apparatus, and systems for profiling parameters/attributes of web application layer traffic in a privacy-preserving manner without having to rely on computationally expensive encryption techniques. Embodiments achieve this by masking or obfuscating parameter values associated with parameters of web application layer traffic in a manner that preserves privacy while still preserving certain information about the parameter values that can be used (e.g., by a third-party vendor) to generate profiles of the parameters. An embodiment is a method by one or more network devices (e.g., in a cloud) communicatively coupled to a web application layer proxy for profiling parameters of web application layer requests received by the web application layer proxy while preserving privacy. The method includes obtaining masked parameter values associated with a parameter of the web application layer requests, where the masked parameter values associated with the parameter are generated by the web application layer proxy based on masking parameter values associated with the parameter while preserving lengths of the parameter values associated with the parameter and character types of characters in the parameter values associated with the parameter, determining whether a profile of the parameter can be generated based on analyzing the masked parameter values associated with the parameter, generating the profile of the parameter in response to a determination that the profile of the parameter can be generated based on analyzing the masked parameter values associated with the parameter, and providing the profile of the parameter to the web application layer proxy, where the web application layer proxy uses the profile of the parameter to detect when parameter values associated with the parameter of future web application layer requests received by the web application layer proxy do not conform to the profile of the parameter. In one embodiment, the method further includes sending a request to the web application layer proxy to provide aggregated and shuffled parameter values associated with the parameter in response to a determination that the profile of the parameter cannot be generated based on analyzing the masked parameter values associated with the parameter, obtaining the aggregated and shuffled parameter values associated with the parameter, where the aggregated and shuffled parameter values associated with the parameter are generated by the web application layer proxy based on aggregating parameter values associated with the parameter and shuffling characters in the aggregated parameter values, determining whether a profile of the parameter can be generated based on analyzing the aggregated and shuffled parameter values associated with the parameter, generating the profile of the parameter in response to a determination that the profile of the parameter can be generated based on analyzing the aggregated and shuffled parameter values associated with the parameter, and providing the profile of the parameter to the web application layer proxy, where the web application layer proxy uses the profile of the parameter to detect when parameter values associated with the parameter of future web application layer requests received by the web application layer proxy do not conform to the profile of the parameter. Various embodiments are further described herein with reference to the accompanying figures.

FIG. 1 is a block diagram of a system in which parameters of web application layer requests can be profiled in a privacy-preserving manner, according to some embodiments. As shown in the diagram, the system includes web application clients 110A-M, web application server 130, a web application layer proxy 120 that is communicatively coupled between the web application clients 110 and the web application server 130, and a parameter profiler manager 150 communicatively coupled to the web application layer proxy 120.

The web application clients 110 may access a web application implemented by the web application server 130, for example, by generating one or more web application layer requests (e.g., Hypertext Transfer Protocol (HTTP) request messages such as "POST" HTTP request messages or "GET" HTTP request messages) and sending these web application layer requests to the web application server 130. In response to receiving web application layer requests, the web application server 130 may send corresponding web application layer responses (e.g., HTTP response messages) containing the data/content of the web application to the web application clients 110. The web application clients 110 may then render the contents of the web application layer responses (e.g., on a display screen for an end user) or otherwise use the contents of the web application layer responses. The web application layer requests and the corresponding web application layer responses may be generally referred to as web application layer traffic. Each of the web application clients 110 may be implemented by a client end station and the web application server 130 may be implemented by one or more server end stations.

The web application layer proxy 120 may be deployed "in front" of the web application server 130 to protect the web application server 130 from attacks by the web application clients 110. In one embodiment, the web application layer proxy 120 sits inline to the traffic being sent between the web application clients 110 and the web application server 130 such that it can see the traffic being sent to the web application server 130 (and possibly traffic being sent in the other direction by the web application server 130 to the web application clients 110). In one embodiment, the web application layer proxy 120 and the web application server 130 reside in an enterprise network 198 of an enterprise (in such case the web application layer proxy 120 is said to be an "on-premise" network device). An enterprise may be a business, organization, governmental body, or other collective body. In one embodiment, the web application layer proxy 120 implements a web application firewall (e.g., that detects and blocks traffic that is deemed to be malicious based on applying security rules to traffic). The web application layer proxy 120 may also implement other functionality such as content caching, traffic scrubbing, Internet Protocol (IP) address masking, and/or load balancing. The web application layer proxy 120 may be implemented by one or more network devices.

The web application layer traffic (e.g., web application layer requests and/or web application layer responses) sent between the web application clients 110 and the web application server 130 may have one or more parameters/attributes. The one or more parameters may include parameters that are included in the web application layer traffic itself (e.g., HTTP header parameters and/or Hypertext Markup Language (HTML) form parameters) and/or parameters that are defined by the web application layer proxy. For example, a web application layer request may have a source IP address parameter to indicate the IP address associated with the web application client 110 that originated the web application layer request (which is typically found in the network layer of the Open Systems Interconnection (OSI) model), a URL parameter to indicate the URL that the web application layer request is requesting, and/or parameters of a Hypertext Markup Language (HTML) form to indicate form input values.

As shown in the diagram, the web application layer proxy 120 includes a parameter profiler agent 140. The parameter profiler agent 140 may parse/analyze web application layer requests received by the web application layer proxy 120 to determine the parameters of the web application layer request and their respective parameter values. The parameter profiler agent 140 may also apply a masking function to the parameter values to mask the parameter values in such a way that preserves privacy while at the same time preserving certain information about the parameter values that allows a third-party vendor to profile the parameters in a meaningful way. For example, the parameter profiler agent 140 may apply a masking function to a parameter value that preserves the length of the parameter value and the character types of characters in the parameter value. This may be achieved, for example, by replacing digits in the parameter value with a designated character (e.g., '1'), replacing letters in the parameter value with another designated character (e.g., 'a'), replacing special characters (e.g., (non-alphanumeric characters) in the parameter value with yet another designated character (e.g., '!'), and reordering the characters so that characters of the same type are grouped together. Using this masking function as an example, the parameter value "2019" may be masked as "1111," the parameter value "david' may be masked as "aaaaa," and the parameter value "!23A56" may be masked as "a1111!." It should be understood that this is just one example of a masking function and that the parameter profiler agent 140 can use other types of masking functions to preserve privacy of data while also preserving certain information about the parameter values that allows a third-party vendor to profile the parameters in a meaningful way.

In one embodiment, for parameters for which grouping is essential in the profiling process (e.g., URL parameters or IP address parameters), the parameter profiler agent 140 applies a deterministic masking function to the parameter values associated with those parameters that can only be calculated by the parameter profiler agent 140 or within the enterprise network 198. For example, the parameter profiler agent 140 may apply an Advanced Encryption Standard (AES) encryption function to parameter values using a private cryptographic key (e.g., that is only known within the enterprise). With deterministic masking functions such as an AES encryption function, encrypting the same value using the same cryptographic key always produces the same result. As such, the encrypted result can be used for grouping purposes without having to be decrypted, which preserves privacy of data. Also, deterministic masking functions such as the AES encryption function are generally faster than homomorphic encryption.

For example, it may be desirable to profile traffic on a per-URL basis, where each Uniform Resource Locator (URL) has its own set of parameters that is to be profiled. Thus, when profiling traffic of a web application, the traffic for different URLs are essentially profiled independently of each other. However, it may be desirable to also keep the URLs themselves private. In this case, privacy may be preserved by masking the URL using a deterministic masking function (e.g., by applying an AES encryption function to the URL using a private cryptographic key) and masking the parameter values associated with the parameters of the URL (e.g., using a masking function that preserves lengths and character types as mentioned above). The masked URL and the masked parameter values of the URL may be collectively referred to as a "record". The parameter profiler agent 140 may send records (for different URLs) to a third-party vendor (e.g., the parameter profiler manager 150), which can group the records based on their masked URLs (e.g., using a Structured Query Language (SQL) "GROUP BY" statement). This preserves privacy of the URL while still allowing the third-party vendor to distinguish between same/different URLs. As another example, the parameter profiler manager 150 may decide to only profile traffic in cases where certain parameter values or characteristics are present in web application layer requests coming from multiple different IP addresses (e.g., to reduce the impact of a single IP address). In these cases, the IP address from which web application layer requests are sent becomes important for the traffic profiling process. However, it may be desirable to keep the IP address private. In this case, a deterministic masking function may be applied to the IP address (e.g., apply an AES encryption function to the IP address using a private cryptographic key) to preserve privacy of the IP addresses while still distinguishing between same/different IP addresses.

The web application layer proxy 120 may send masked parameter values associated with a parameter (e.g., that were generated by the parameter profiler agent 140) to the parameter profiler manager 150 to allow the parameter profiler manager 150 to generate a profile of the parameter. The parameter profiler manager 150 may be owned or otherwise controlled by a third-party vendor of the enterprise with which the web application layer proxy 120 is associated with (thus making privacy important). In one embodiment, the web application layer proxy 120 only masks and sends parameter values for web application layer requests that have been determined by the web application layer proxy 120 not to include an attack (e.g., so that the parameter profiler manager 150 can generate a baseline/profile for what non-malicious parameter values should look like).

The parameter profiler manager 150 may receive masked parameter values associated with a parameter from the web application layer proxy 120 and attempt to generate a profile of the parameter based on analyzing the masked parameter values. For example, the parameter profiler manager 150 may analyze the masked parameter values associated with a parameter to identify any common characteristics of those parameter values and/or patterns appearing in those parameter values. The parameter profiler manager 150 may then generate a profile of the parameter that describes those characteristics and/or patterns (e.g., the profile of a parameter may indicate that the parameter values associated with this parameter always have length 4 and consist of all numbers (e.g., if the parameter is used for specifying the year in a "YYYY" format)). As another example, the parameter profiler manager 150 may analyze the masked parameter values associated with a parameter to determine the parameter type (e.g., whether the parameter is a credit card number type, telephone number type, an email address type, a boolean type, etc.). The parameter profiler manager 150 may then generate a profile of the parameter that indicates the determined parameter type (or that describes the expected data format of that parameter type). If the parameter profiler manager 150 is able to generate a profile of the parameter based on analyzing the masked parameter values, then it may send the profile to the web application layer proxy 120 so that the web application layer proxy 120 can use the profile to detect attacks (e.g., by detecting when parameter values associated with the parameter of future web application layer requests received by the web application layer proxy do not conform to the profile of the parameter).

In some cases, the parameter profiler manager 150 may not be able to generate a profile of a parameter, for example, because it is not able to identify common characteristics or patterns appearing in the parameter values with sufficient confidence or it is not able to determine the parameter type based on analyzing the masked parameter values. In one embodiment, if the parameter profiler manager 150 is unable to generate a profile of a parameter, it may send a request to the web application layer proxy 120 to provide additional data regarding the parameter values associated with the parameter. For example, the parameter profiler manager 150 may send a request to the web application layer proxy 120 to provide aggregated and shuffled parameter values associated with the parameter. In response, the parameter profiler agent 140 of the web application layer proxy 120 may generate aggregated and shuffled parameter values associated with the parameter by aggregating a number of parameter values associated with the parameter (e.g., N parameter values (where N is a positive integer greater than 1) across different web application layer requests) and randomly shuffling the characters in the aggregated parameter values to generate a "sack" of characters. In one embodiment, the parameter profiler agent 140 may only aggregate the first X characters (where X is a positive integer greater than 1) of each parameter value and randomly shuffle those characters to generate the "sack" of characters (e.g., to reduce the number of characters). The web application layer proxy 120 may send the aggregated and shuffled parameter values to the parameter profiler manager 150 to allow the parameter profiler manager 150 to generate a profile of the parameter.

The parameter profiler manager 150 may receive the aggregated and shuffled parameter values associated with the parameter and attempt to generate a profile of the parameter based on analyzing the aggregated and shuffled parameter values (and possibly in conjunction with analyzing the masked parameter values associated with the parameter that were previously received by the parameter profiler manager 150). Since the aggregated and shuffled parameter values include the actual characters in the parameter values, they may provide additional information about the parameter values that can be useful for generating a profile of the parameter while still preserving privacy. For example, the presence of multiple '@' characters in the "sack" of characters may hint at the parameter being an email address type parameter. It should be noted that this type of information was not available in the masked parameter values at least in the examples provided above. If the parameter profiler manager 150 is able to generate a profile of the parameter based on analyzing the aggregated and shuffled parameter values, then it may send the profile to the web application layer proxy 120 so that the web application layer proxy 120 can use the profile to detect attacks (e.g., by detecting when parameter values associated with the parameter of future web application layer requests received by the web application layer proxy do not conform to the profile of the parameter).

In one embodiment, once the parameter profiler manager 150 determines the parameter type of a parameter, it determines a masking function for the parameter which can be applied to parameter values associated with that parameter to appropriately mask the parameter values. For example, if the parameter profiler manager 150 determines that a particular parameter is a credit card number type parameter then it may determine that the appropriate masking function is a masking function that hides all but the last four digits of the credit card number. As another example, if the parameter profiler manager 150 determines that a particular parameter is an email address type parameter, then it may determine that the appropriate masking function is a masking function that hides all but the domain name portion of the email address. The parameter profiler manager 150 may send a specification of the masking function determined for the parameter (e.g., hide all but the last four digits for credit card numbers) to the web application layer proxy 120 so that the web application layer proxy 120 can apply the masking function (according to the specification) to parameter values associated with the parameter when privacy of data is desired. This allows the parameter profiler manager 150 to provide guidance to the web application layer proxy 120 (and specifically the parameter profiler agent 140 of the web application layer proxy 120) regarding how to mask certain parameter values. In some embodiments, the parameter profiler manager 150 is the main component that performs traffic profiling and thus knows the status of the profiling at any moment. As such, the parameter profiler manager 150 may know what type of additional information it needs from the web application layer proxy 120 to complete the profiling, and thus can request that the web application layer proxy 120 to mask parameter values in a particular way that will provide the additional information needed to complete the profiling while still preserving privacy of data. In other embodiments, the web application layer proxy 120 itself may make decisions regarding how to mask certain parameter values without receiving such specific guidance from the parameter profiler manager 150.

In one embodiment, the parameter profiler manager 150 is implemented in a cloud 197 (e.g., as a SaaS in a cloud provided by a cloud provider such as Amazon®, Microsoft®, etc.).

Exemplary operations for profiling parameters in a privacy-preserving manner will now be described with reference to FIG. 1 to further illustrate an embodiment of the invention. At circle '1' a web application client 110 sends a web application layer request that is intended for the web application server 130, where the web application layer request includes a URL parameter, a year parameter, a name parameter, and a password parameter. In this example, the parameter value associated with the URL parameter is "www.xyz.com/x," the parameter value associated with the year parameter is "2019," the parameter value associated with the name parameter is "david," and the parameter value associated with the password parameter is "!23A56." At circle '2' the web application layer proxy 120 (e.g., which resides in the enterprise network 198) intercepts the web application layer request before it reaches the web application server 130 and the parameter profiler agent 140 of the web application layer proxy 120 parses/analyzes the web application layer request to determine the parameters of the web application layer request and their respective parameter values. At circle '3' the parameter profiler agent 140 applies a masking function to the parameter values to mask the parameter values in a manner that preserves the lengths of the parameter values and that preserves the character types of the characters in the parameter values. In this example, the parameter value "2019" is masked as "1111," the parameter value "david" is masked as "aaaaa," and the parameter value "!23A56" is masked as "a1111!" (where the masking represents digits using the character '1', represents letters using the character 'a', and represents special characters using the character '!'). At circle '4' the web application layer proxy 120 sends the masked parameter values to the parameter profiler manager 150 (e.g., which resides in the cloud 197 and is operated/controlled by a third-party vendor used by the enterprise).

At circle '5' the parameter profiler manager 150 attempts to generate a profile for each of the parameters based on the masked parameter values associated with that parameter (which may include the masked parameter values previously sent at circle '4' as well as additional masked parameter values previously sent by the web application layer proxy 120 to the parameter profiler manager 150 prior to circle '4'). In this example, the parameter profiler manager 150 learns, based on analyzing the masked parameter values, that the year parameter is an integer with length 4 and thus is able to generate a profile for the year parameter but is unable to learn enough about the other parameters to generate a profile for those parameters. At circle '6' the parameter profiler manager 150 sends the profile of the year parameter to the web application layer proxy 120 and an indication that profiles could not be generated for the name parameter and the password parameter (designated as "learning failed"). The web application layer proxy 120 may then use the profile of the year parameter to detect when a parameter value associated with the year parameter of future web application layer requests received by the web application layer proxy 120 deviates from the profile, which may be indicative of an attack (or suspicious/unexpected behavior). The indication that a profile could not be generated for the name parameter and password parameter may signal to the parameter profiler agent 140 that it should provide additional data to the parameter profiler manager 150 (e.g., in the form of aggregated and shuffled parameter values, as will be further described below).

At circle '7' one or more web application clients send further web application layer requests to the URL "www.xyz.com/x" with parameters year, name, and password. At circle '8' the web application layer proxy 120 intercepts these web application layer requests before they reach the web application server 130 and the parameter profiler agent 140 of the web application layer proxy 120 aggregates and shuffles parameter values associated with the name parameter and password parameter, respectively. At circle '9' the web application layer proxy 120 sends the aggregated and shuffled parameter values associated with the name parameter and the aggregated and shuffled parameter values associated with the password parameter to the parameter profiler manager 150. At circle '10' the parameter profiler manager 150 attempts to generate profiles for the name parameter and the password parameter based on the aggregated and shuffled parameter values. In this example, the parameter profiler manager 150 is able to learn, based on analyzing the aggregated and shuffled parameter values associated with the name parameter, that the name parameter consists of letters and apostrophes and thus is able to generate a profile for the name parameter. Also, the parameter profiler manager 150 is able to learn, based on analyzing the aggregated and shuffled parameter values associated with the password parameter, that the password parameter consists of alphanumeric characters having length less than 20 and thus is able to generate a profile for the password parameter. At circle '11' the parameter profiler manager 150 sends the profile of the name parameter and the profile of the password parameter to the web application layer proxy 120. The web application layer proxy 120 may then use the profile of the name parameter and/or the profile of the password parameter to detect when a parameter value associated with any of those parameters deviates from the corresponding profile, which may be indicative of an attack (or suspicious/unexpected behavior). At circle '12' the parameter profiling is complete for all of the parameters with respect to the year parameter, name parameter, and the password parameter.

A benefit of embodiments disclosed herein is that they allow for profiling web application layer traffic in a privacy-preserving manner without having to rely on computationally expensive encryption techniques such as homomorphic encryption. Embodiments may be particularly applicable when a third-party vendor (e.g., a SaaS implemented in the cloud 197) is employed to profile the web application layer traffic seen by an on-premise web application layer proxy (e.g., a web application layer proxy 120 residing in the enterprise network 198).

While the diagram shows that system as including a single web application layer proxy 120, in some embodiments the system may include multiple web application layer proxies 120 (e.g., that are geographically dispersed), which are communicatively coupled between the web application clients 110 and the web application server 130 to protect the web application server 130, and each of the web application layer proxies 120 may send masked parameter values and/or aggregated and shuffled parameter values to the parameter profiler manager 150. The parameter profiler manager 150 may then analyze the masked parameter values and/or the aggregated and shuffled parameter values received from multiple different web application layer proxies to generate profiles of parameters.

Also, while the diagram shows an inline deployment (the web application layer proxy 120 sits inline to the traffic between the web application clients 110 and the web application server 130), it should be understood that the parameter profiling techniques described herein can also be implemented in non-inline deployments (e.g., a system may include a security device that sniffs traffic being sent between the web application clients 110 and the web application server 130 (without being inline to the traffic), which sends masked parameter values and aggregated/shuffled parameter values to the parameter profiler manager 150).

Figure 2:
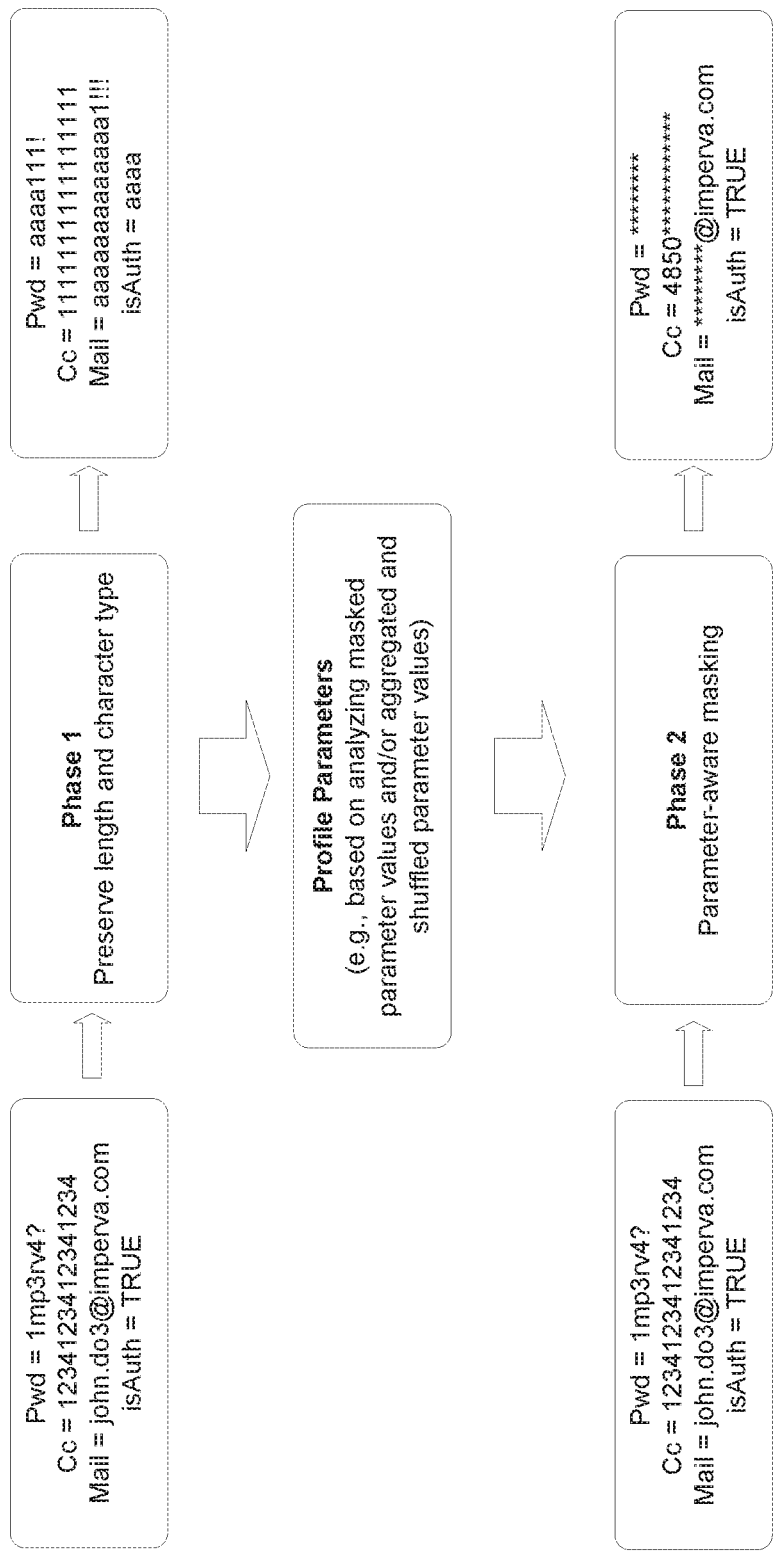
FIG. 2 is a diagram illustrating different phases of parameter value masking, according to some embodiments.

FIG. 2 is a diagram illustrating different phases of parameter value masking, according to some embodiments. In one embodiment, parameter values can be masked using two phases. In the first phase ("Phase 1"), parameter values are masked in a manner that preserves the length and character types. For example, the parameter value "1mp3rv4?" (associated with parameter "Pwd") is masked as "aaaa111!," the parameter value "1234123412341234" (associated with parameter "Cc") is masked as "1111111111111111," the parameter value "john.doe3@imperva.com" (associated with parameter "Mail") is masked as "aaaaaaaaaaaaa1!!!," and the parameter value "TRUE" (associated with parameter "isAuth") is masked as "aaaa" (where the masking represents digits using the character '1', represents letters using the character 'a', and represents special characters using the character '!').

The parameter profiler manager 150 may profile each of the parameters based on analyzing the masked parameter values associated with the parameters and/or aggregated and shuffled parameter values associated with the parameters, as described above. For example, the parameter profiler manager 150 may learn, based on analyzing the masked parameter values and/or the aggregated and shuffled parameter values, the parameter types of each of the parameters. In this example, the parameter profiler manager 150 learns that the "Pwd" parameter is a password type parameter, the "Cc" parameter is a credit card number type parameter, the "Mail" parameter is an email address type parameter, and the "isAuth" parameter is a Boolean type parameter.

Once the parameters have been profiled, in the second phase ("Phase 2"), parameter values are masked based according to their parameter types. For example, since the "Pwd" parameter has been determined as being a password type parameter, the parameter value "1mp3rv4?" is completely masked as "******." Since the "Cc" parameter has been determined as being a credit card number type parameter, the parameter value "1234123412341234" is masked as "********1234" to only reveal the last four digits. Since the "Mail" parameter has been determined as being an email address type parameter, the parameter value "john.doe3@imperva.com" is masked as "******@imperva.com" to only reveal the domain name portion of the email address. Since the "isAuth" parameter has been determined as being a boolean type parameter, the parameter value "TRUE" is not masked at all.

FIG. 3 is a diagram illustrating communications between the parameter profiler agent and the parameter profiler manager, according to some embodiments. As mentioned above, if the parameter profiler manager 150 is unable to generate a profile of a parameter, then it may send a request to the web application layer proxy 120 (and specifically the parameter profiler agent 140 of the web application layer proxy 120) to provide additional data such as aggregated and shuffled parameter values associated with that parameter. For example, as shown in the diagram, if the parameter profiler manager 150 is unable to generate a profile for the "Cc" parameter, then it may send a request to the parameter profiler agent 140 for a mix of 10 "Cc" parameter values. In response, the parameter profiler agent 140 aggregates 10 "cc" parameter values and shuffles the characters in the aggregated parameter values to generate a mix of 10 "Cc" parameter values and sends the mix of 10 "Cc" parameter values (a "sack" of parameter values) to the parameter profiler manager 150. Similarly, the parameter profiler manager 150 may send a request to the parameter profiler agent 140 for a mix of 10 "Pwd" parameter values, a mix of 10 "Mail" parameter values, and a mix of 10 "isAuth" parameter values. The parameter profiler agent 140 may fulfill these requests by aggregating and shuffling the parameter values associated with the respective requested parameters to generate a mix of 10 parameter values and sending the mix of 10 parameter values to the parameter profiler manager 150. While the parameter profiler manager 150 in this example requests 10 parameter values for each parameter, this is purely exemplary, and it should be understood that the parameter profiler manager 150 can request a different number of parameter values depending on the security needs (having more parameter values will generally lead to more accurate profiles but may take longer to analyze and consume more bandwidth).

FIG. 4 is a diagram illustrating aggregated and shuffled parameter values, according to some embodiments. The diagram shows 10 "Cc" parameter values that are aggregated and shuffled to generate aggregated and shuffled "Cc" parameter values, 10 "Pwd" parameter values that are aggregated and shuffled to generate aggregated and shuffled "Pwd" parameter values, 10 "Mail" parameter values that are aggregated and shuffled to generate aggregated and shuffled "Mail" parameter values, and 10 "isAuth" parameter values that are aggregated and shuffled to generate aggregated and shuffled "isAuth" parameter values. As mentioned above, since the aggregated and shuffled parameter values expose the characters in the parameter values, they may provide more insight regarding the parameter values compared to masked parameter values while still preserving privacy of data. For example, the parameter profiler manager 150 may determine that the "Mail" parameter is an email address type parameter based on the presence of multiple '@' characters (and the absence of certain special characters that are not allowed in email addresses). As another example, the parameter profiler manager 150 may determine that the "isAuth" parameter is a Boolean type parameter based on the presence of the characters that make up the words "TRUE" and "FALSE" (and the absence of other characters).

Figure 5:
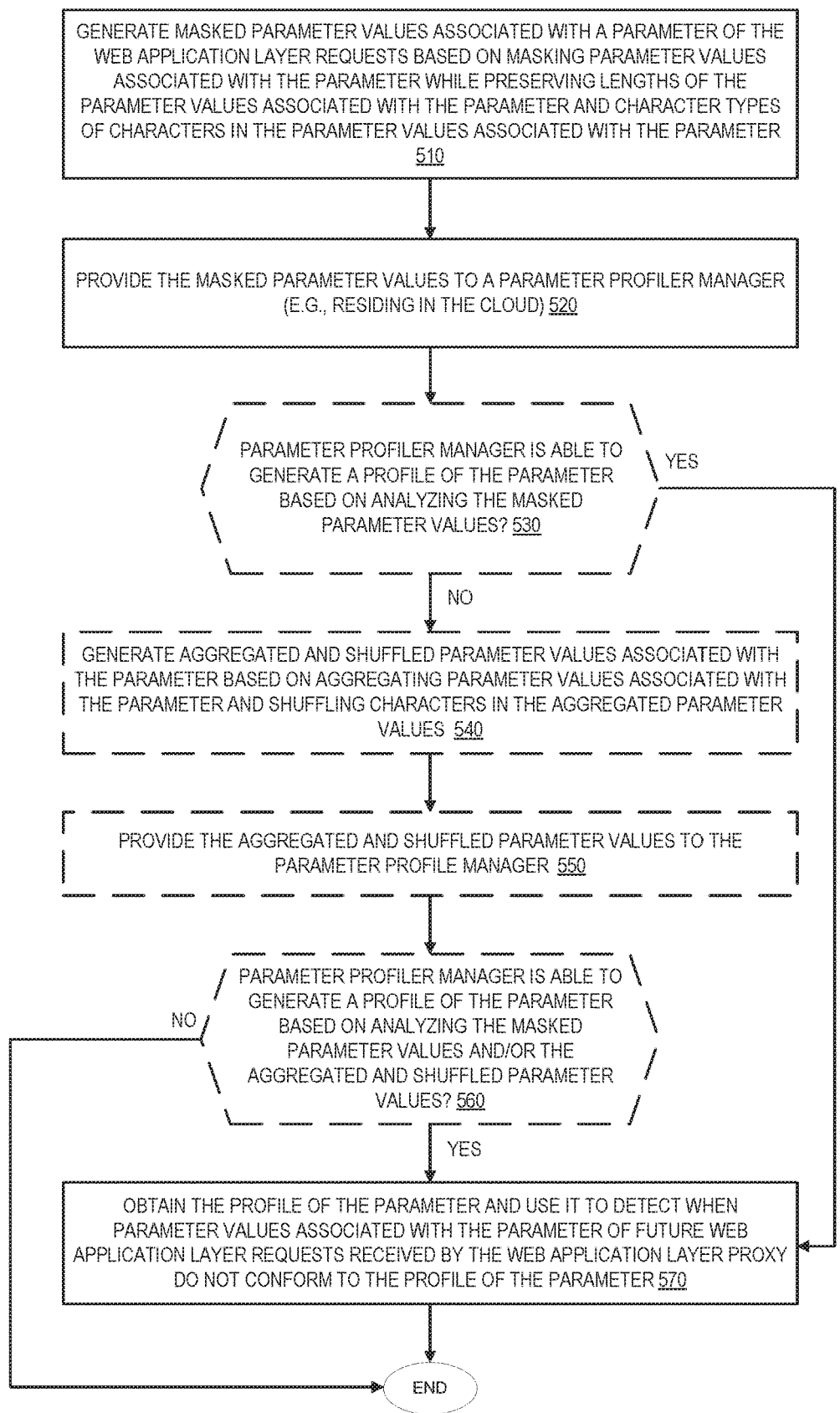
FIG. 5 is a flow diagram of a process for providing data regarding parameter values associated with a parameter in a privacy-preserving manner, according to some embodiments.

FIG. 5 is a flow diagram of a process for providing data regarding parameter values associated with a parameter of web application layer requests in a privacy-preserving manner, according to some embodiments. In one embodiment, the process is implemented by a web application layer proxy (e.g., that includes a parameter profiler agent), where the web application layer proxy is communicatively coupled between one or more web application clients and one or more web application servers, and where the web application layer proxy is further communicatively coupled to a parameter profiler manager. The process may be implemented using hardware, software, firmware, or any combination thereof.

At block 510, the web application layer proxy generates masked parameter values associated with a parameter of the web application layer requests (seen by the web application layer proxy) based on masking parameter values associated with the parameter while preserving lengths of the parameter values associated with the parameter and character types of characters in the parameter values associated with the parameter.

At block 520, the web application layer proxy provides the masked parameter values to a parameter profiler manager (e.g., residing in the cloud). The web application layer proxy may provide the masked parameter values to the parameter profiler manager, for example, by directly sending the masked parameter values to the parameter profiler manager, storing the masked parameter values in a storage accessible to the parameter profiler manager, or other means.

In one embodiment, at decision block 530, the web application layer proxy determines whether the parameter profiler manager is able to generate a profile of the parameter based on the parameter profiler manager analyzing the masked parameter values. If so, then the process moves to block 570, where the web application layer proxy obtains the profile of the parameter (which was generated by the parameter profiler manager) and uses the profile of the parameter to detect when parameter values associated with the parameter of future web application layer requests received by the web application layer proxy do not conform to the profile of the parameter (which may be indicative of an attack or suspicious/unexpected behavior).

Returning to decision block 530, if the web application layer proxy determines that the parameter profiler manager is not able to generate a profile of the parameter based on the parameter profiler manager analyzing the masked parameter values, then at block 540, the web application layer proxy generates aggregated and shuffled parameter values associated with the parameter based on aggregating parameter values associated with the parameter and shuffling characters in the aggregated parameter values. At block 550, the web application layer proxy then provides the aggregated and shuffled parameter values to the parameter profiler manager (e.g., by sending the aggregated and shuffled parameter values directly to the parameter profiler manager or storing the aggregated and shuffled parameter values in a storage accessible to the parameter profiler manager).

In one embodiment, at decision block 560, the web application layer proxy determines whether the parameter profiler manager is able to generate a profile of the parameter based on the parameter profiler manager analyzing the masked parameter values and/or the aggregated and shuffled parameter values. If so, then the process moves to block 570, where the web application layer proxy obtains the profile of the parameter (which was generated by the parameter profiler manager) and uses the profile of the parameter to detect when parameter values associated with the parameter of future web application layer requests received by the web application layer proxy do not conform to the profile of the parameter (which may be indicative of an attack or suspicious/unexpected behavior).

Returning to decision block 560, if the web application layer proxy determines that parameter profiler manager is not able to generate a profile of the parameter based on the parameter profiler manager analyzing the masked parameter values and/or the aggregated and shuffled parameter values, then the process may end. In some embodiments, the web application layer proxy may provide additional data to the parameter profiler agent to help the parameter profiler agent generate a profile of the parameter (e.g., more masked parameter values and/or shuffled and aggregated parameter values).

Figure 6:
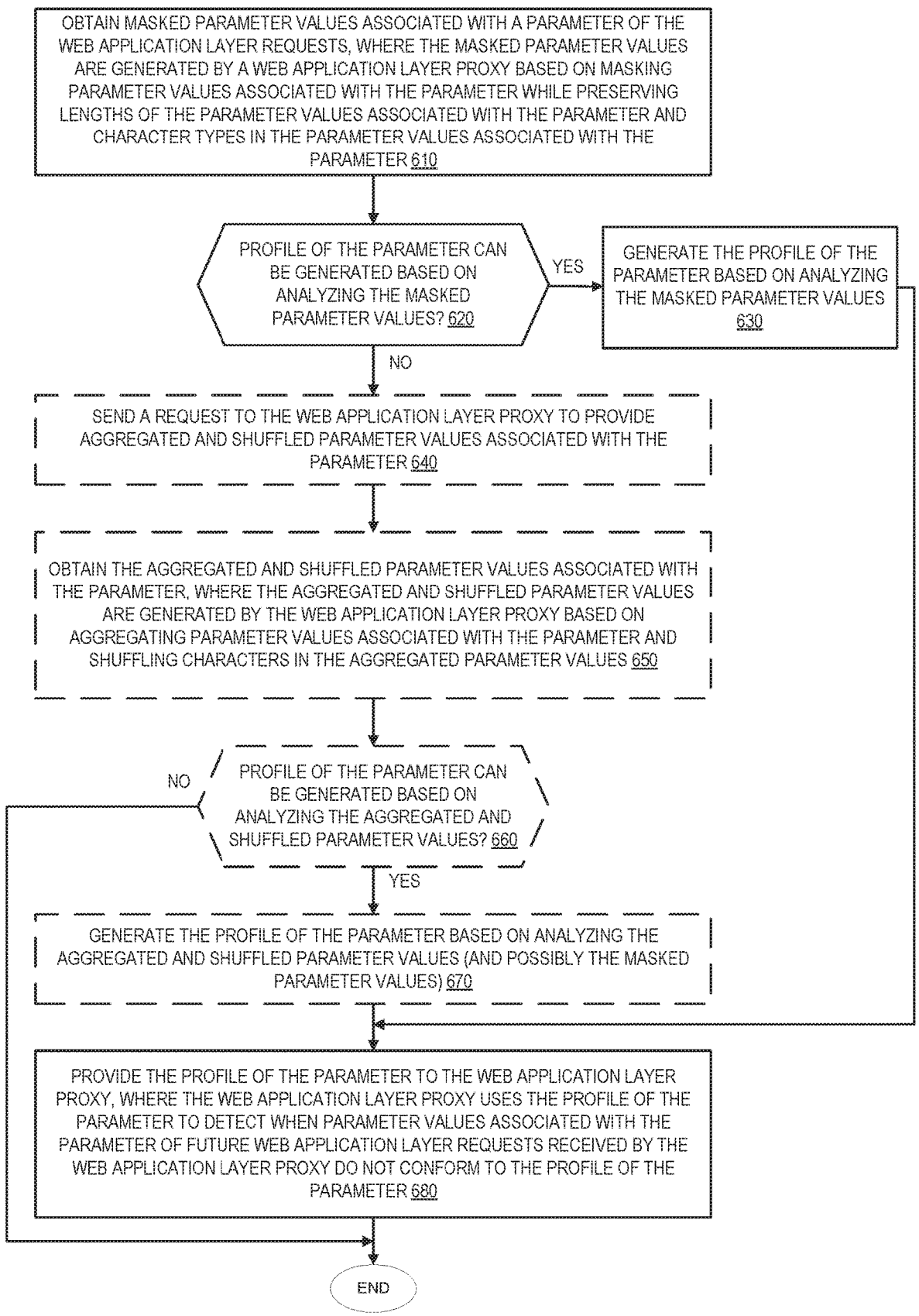
FIG. 6 is a flow diagram of a process for profiling parameters of web application layer requests in a privacy-preserving manner, according to some embodiments.

FIG. 6 is a flow diagram of a process for profiling parameters of web application layer requests in a privacy-preserving manner, according to some embodiments. In one embodiment, the process is implemented by one or more network devices implementing a parameter profiler manager (e.g., residing in the cloud) communicatively coupled to a web application layer proxy, where the web application layer proxy is communicatively coupled between one or more web application clients and one or more web application servers. The process may be implemented using hardware, software, firmware, or any combination thereof.

At block 610, the parameter profiler manager obtains masked parameter values associated with a parameter of the web application layer requests (seen by the web application layer proxy), where the masked parameter values are generated by a web application layer proxy based on masking parameter values associated with the parameter while preserving lengths of the parameter values associated with the parameter and character types of characters in the parameter values associated with the parameter.

At decision block 620, the parameter profiler manager determines whether a profile of the parameter can be generated based on analyzing the masked parameter values. If so, at block 630, the parameter profiler manager generates the profile of the parameter based on analyzing the masked parameter values. The process then moves to block 680, where the parameter profiler manager provides the profile of the parameter to the web application layer proxy, where the web application layer proxy uses the profile of the parameter to detect when parameter values associated with the parameter of future web application layer requests received by the web application layer proxy do not conform to the profile of the parameter (which may be indicative of an attack or suspicious/unexpected behavior). The web application layer proxy may provide the profile of the parameter to the web application layer proxy, for example, by directly sending the profile to the web application layer proxy, storing the profile in a storage accessible to the web application layer proxy, or other means.

Returning to decision block 620, if the parameter profiler manager determines that the profile of the parameter cannot be generated based on analyzing the masked parameter values, in one embodiment, at block 640, the parameter profiler manager sends a request to the web application layer proxy to provide aggregated and shuffled parameter values associated with the parameter.

At block 650, the parameter profiler manager obtains the aggregated and shuffled parameter values associated with the parameter, where the aggregated and shuffled parameter values are generated by the web application layer proxy (e.g., responsive to the request sent by the parameter profiler manager to the web application layer proxy at block 640) based on aggregating parameter values associated with the parameter and shuffling characters in the aggregated parameter values.

At decision block 660, the parameter profiler manager determines whether the profile of the parameter can be generated based on analyzing the aggregated and shuffled parameter values (and possibly in conjunction with analyzing the masked parameter values). If so, at block 670, the parameter profiler manager generates the profile of the parameter based on analyzing the aggregated and shuffled parameter values (and possibly the masked parameter values) and at block 680, provides the profile of the parameter to the web application layer proxy (e.g., by sending the profile of the parameter directly to the web application layer proxy or storing the profile in a storage accessible to the web application layer proxy). The web application layer proxy may use the profile of the parameter to detect when parameter values associated with the parameter of future web application layer requests received by the web application layer proxy do not conform to the profile of the parameter (which may be indicative of an attack or suspicious/unexpected behavior).

Returning to decision block 660, if the parameter profiler manager determines that the profile of the parameter cannot be generated based on analyzing the aggregated and shuffled parameter values, then the process ends. In some embodiments, the parameter profiler manager may send a request to the web application layer proxy to provide additional data to help the parameter profiler agent generate a profile of the parameter (request for more masked parameter values and/or shuffled and aggregated parameter values).

In one embodiment, the parameter profiler manager obtains masked parameter values associated with a parameter of the web application layer requests, where the masked parameter values associated with the parameter are generated by the web application layer proxy based on applying a deterministic masking function to parameter values associated with the parameter, where the masked parameter values associated with the parameter are used when analyzing the masked parameter values associated with one or more other parameters (e.g., used for grouping purposes during the profiling process). In one embodiment, the deterministic masking function is an AES encryption function. In one embodiment, the parameter is an IP address parameter (e.g., source IP address parameter or destination IP address) or a URL parameter.

In one embodiment, the parameter profiler manager determines a masking function for a parameter based on analyzing the masked parameter values associated with the parameter or the aggregated and shuffled parameter values associated with the parameter. The parameter profiler manager may then provide a specification of the masking function for the parameter to the web application layer proxy, where the web application layer proxy applies the masking function for the parameter (e.g., according to the specification that was provided) to parameter values associated with the parameter of future web application layer requests received by the web application layer proxy when privacy of data is desired (e.g., when providing the parameter values to the parameter profiler manager for analysis). In one embodiment, the masking function replaces one or more characters in the parameter values associated with the parameter of future web application layer requests with a designated character (e.g., the '*' character).

While various embodiments have been disclosed herein for profiling parameters of web application layer traffic in a privacy-preserving manner, it should be understood that the techniques disclosed herein can be applied to other types of applications besides web applications. For example, the techniques described herein can be used to profile parameters in traffic sent/received to/from database servers, file servers, email servers, and the like.

Figure 7:
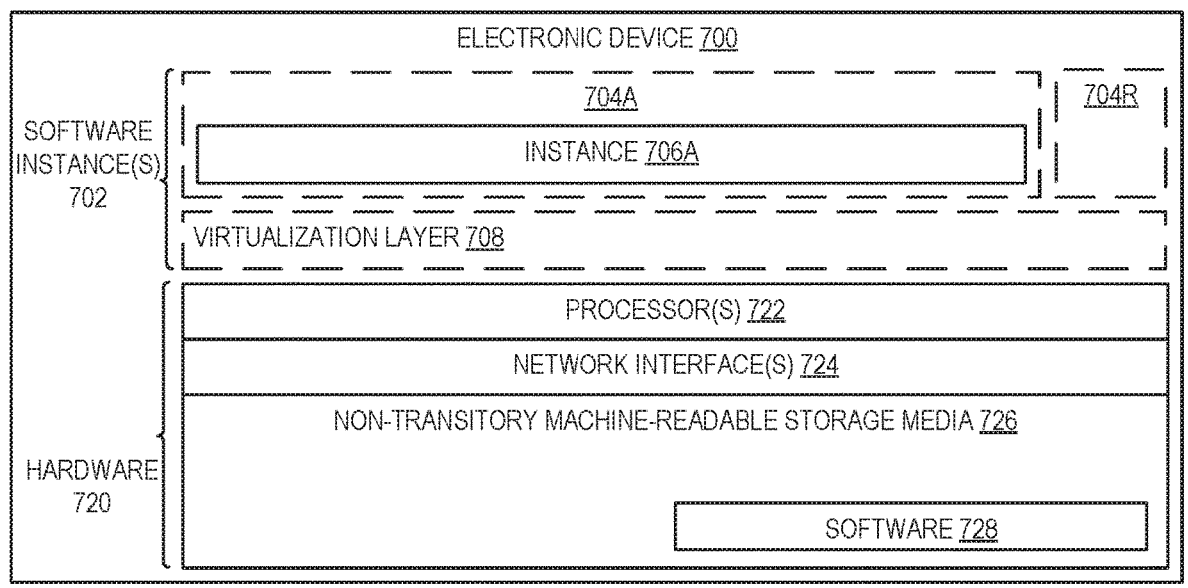
FIG. 7 is a block diagram illustrating an electronic device, according to some embodiments.

FIG. 7 is a block diagram illustrating an electronic device, according to some embodiments. FIG. 7 illustrates hardware 720 comprising a set of one or more processor(s) 722, a set of one or more network interfaces 724 (wireless and/or wired), and non-transitory machine-readable storage medium/media 726 having stored therein software 728 (which includes instructions executable by the set of one or more processor(s) 722). Software 728 can include code, which when executed by hardware 720, causes the electronic device 700 to perform operations of one or more embodiments described herein (e.g., operations for profiling parameters of web application layer requests in a privacy-preserving manner and/or operations for providing data regarding parameter values associated with a parameter in a privacy-preserving manner). Thus, as previously described, the web application layer proxy 120 (including the parameter profiler agent 140) and the parameter profiler manager 150 may each be implemented by one or more electronic devices.

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices communicatively coupled to a web application layer proxy for profiling parameters of web application layer requests received by the web application layer proxy while preserving privacy, the method comprising:
    obtaining masked parameter values associated with a first parameter of the web application layer requests, wherein the masked parameter values associated with the first parameter are generated by the web application layer proxy based on masking unmasked parameter values associated with the first parameter while preserving character lengths of the unmasked parameter values associated with the first parameter and character types of characters in the unmasked parameter values associated with the first parameter;
    determining whether a profile of the first parameter can be generated based on analyzing the masked parameter values associated with the first parameter;
    generating the profile of the first parameter in response to a determination that the profile of the first parameter can be generated based on analyzing the masked parameter values associated with the first parameter, wherein the profile of the first parameter indicates a parameter type of the first parameter that was learned based on analyzing the masked parameter values associated with the first parameter; and
    providing the profile of the first parameter to the web application layer proxy, wherein the web application layer proxy uses the profile of the first parameter to detect when future parameter values associated with the first parameter of future web application layer requests received by the web application layer proxy do not conform to the profile of the first parameter.

2. The method of claim 1, further comprising:
obtaining masked parameter values associated with a second parameter of the web application layer requests, wherein the masked parameter values associated with the second parameter are generated by the web application layer proxy based on masking unmasked parameter values associated with the second parameter while preserving character lengths of the unmasked parameter values associated with the second parameter and character types of characters in the unmasked parameter values associated with the second parameter;
determining whether a profile of the second parameter can be generated based on analyzing the masked parameter values associated with the second parameter;
sending a request to the web application layer proxy to provide aggregated and shuffled parameter values associated with the second parameter in response to a determination that the profile of the second parameter cannot be generated based on analyzing the masked parameter values associated with the second parameter;
obtaining the aggregated and shuffled parameter values associated with the second parameter, wherein the aggregated and shuffled parameter values associated with the second parameter are generated by the web application layer proxy based on aggregating unmasked parameter values associated with the second parameter and shuffling characters in the aggregated parameter values;
determining whether a profile of the second parameter can be generated based on analyzing the aggregated and shuffled parameter values associated with the second parameter;
generating the profile of the second parameter in response to a determination that the profile of the second parameter can be generated based on analyzing the aggregated and shuffled parameter values associated with the second parameter; and
providing the profile of the second parameter to the web application layer proxy, wherein the web application layer proxy uses the profile of the second parameter to detect when future parameter values associated with the second parameter of future web application layer requests received by the web application layer proxy do not conform to the profile of the second parameter.

3. The method of claim 2, further comprising:
obtaining masked parameter values associated with a third parameter of the web application layer requests, wherein the masked parameter values associated with the third parameter are generated by the web application layer proxy based on applying a deterministic masking function to unmasked parameter values associated with the third parameter, wherein the masked parameter values associated with the third parameter are used for analyzing the masked parameter values associated with the first parameter or analyzing the masked parameter values associated with the second parameter.

4. The method of claim 3, wherein the deterministic masking function is an Advanced Encryption Standard (AES) encryption function.

5. The method of claim 3, wherein the third parameter is an Internet Protocol (IP) address parameter or a Uniform Resource Locator (URL) parameter.

6. The method of claim 2, further comprising:
determining a masking function for the second parameter based on analyzing the masked parameter values associated with the second parameter or the aggregated and shuffled parameter values associated with the second parameter; and
providing a specification of the masking function for the second parameter to the web application layer proxy, wherein the web application layer proxy applies the masking function for the second parameter to further future parameter values associated with the second parameter of future web application layer requests received by the web application layer proxy when providing those further future parameter values to the one or more network devices for analysis.

7. The method of claim 6, wherein the masking function replaces one or more characters in the further future parameter values associated with the second parameter of future web application layer requests with a designated character.

8. The method of claim 1, wherein the character lengths of the unmasked parameter values associated with the first parameter and the character types of characters in the unmasked parameter values associated with the first parameter are preserved based on representing digits in the unmasked parameter values associated with the first parameter using a first designated character, representing letters in the unmasked parameter values associated with the first parameter using a second designated character, and representing special characters in the unmasked parameter values associated with the first parameter using a third designated character.

9. A set of one or more non-transitory machine-readable storage media storing instructions which, when executed by one or more processors of one or more network devices communicatively coupled to a web application layer proxy, causes the one or more network devices to perform operations for profiling parameters of web application layer requests received by the web application layer proxy while preserving privacy, the operations comprising:
obtaining masked parameter values associated with a first parameter of the web application layer requests, wherein the masked parameter values associated with the first parameter are generated by the web application layer proxy based on masking unmasked parameter values associated with the first parameter while preserving character lengths of the unmasked parameter values associated with the first parameter and character types of characters in the unmasked parameter values associated with the first parameter;
determining whether a profile of the first parameter can be generated based on analyzing the masked parameter values associated with the first parameter;
generating the profile of the first parameter in response to a determination that the profile of the first parameter can be generated based on analyzing the masked parameter values associated with the first parameter, wherein the profile of the first parameter indicates a parameter type of the first parameter that was learned based on analyzing the masked parameter values associated with the first parameter; and
providing the profile of the first parameter to the web application layer proxy, wherein the web application layer proxy uses the profile of the first parameter to detect when future parameter values associated with the first parameter of future web application layer requests received by the web application layer proxy do not conform to the profile of the first parameter.

10. The set of one or more non-transitory machine-readable storage media of claim 9, wherein the operations further comprise:
  obtaining masked parameter values associated with a second parameter of the web application layer requests, wherein the masked parameter values associated with the second parameter are generated by the web application layer proxy based on masking unmasked parameter values associated with the second parameter while preserving character lengths of the unmasked parameter values associated with the second parameter and character types of characters in the unmasked parameter values associated with the second parameter;
  determining whether a profile of the second parameter can be generated based on analyzing the masked parameter values associated with the second parameter;
  sending a request to the web application layer proxy to provide aggregated and shuffled parameter values associated with the second parameter in response to a determination that the profile of the second parameter cannot be generated based on analyzing the masked parameter values associated with the second parameter;
  obtaining the aggregated and shuffled parameter values associated with the second parameter, wherein the aggregated and shuffled parameter values associated with the second parameter are generated by the web application layer proxy based on aggregating unmasked parameter values associated with the second parameter and shuffling characters in the aggregated parameter values;
  determining whether a profile of the second parameter can be generated based on analyzing the aggregated and shuffled parameter values associated with the second parameter;
  generating the profile of the second parameter in response to a determination that the profile of the second parameter can be generated based on analyzing the aggregated and shuffled parameter values associated with the second parameter; and
  providing the profile of the second parameter to the web application layer proxy, wherein the web application layer proxy uses the profile of the second parameter to detect when future parameter values associated with the second parameter of future web application layer requests received by the web application layer proxy do not conform to the profile of the second parameter.

11. The set of one or more non-transitory machine-readable storage media of claim 10, wherein the operations further comprise:
  obtaining masked parameter values associated with a third parameter of the web application layer requests, wherein the masked parameter values associated with the third parameter are generated by the web application layer proxy based on applying a deterministic masking function to unmasked parameter values associated with the third parameter, wherein the masked parameter values associated with the third parameter are used when analyzing the masked parameter values associated with the first parameter or analyzing the masked parameter values associated with the second parameter.

12. The set of one or more non-transitory machine-readable storage media of claim 11, wherein the deterministic masking function is an Advanced Encryption Standard (AES) encryption function.

13. The set of one or more non-transitory machine-readable storage media of claim 11, wherein the third parameter is an Internet Protocol (IP) address parameter or a Uniform Resource Locator (URL) parameter.

14. The set of one or more non-transitory machine-readable storage media of claim 9, wherein the character lengths of the unmasked parameter values associated with the first parameter and the character types of characters in the unmasked parameter values associated with the first parameter are preserved based on representing digits in the unmasked parameter values associated with the first parameter using a first designated character, representing letters in the unmasked parameter values associated with the first parameter using a second designated character, and representing special characters in the unmasked parameter values associated with the first parameter using a third designated character.

15. A network device configured to profile parameters of web application layer requests received by a web application layer proxy while preserving privacy, the network device comprising:
  one or more processors; and
  a non-transitory machine-readable storage medium having instructions stored therein, which when executed by the one or more processors, causes the network device to:
    obtain masked parameter values associated with a first parameter of the web application layer requests, wherein the masked parameter values associated with the first parameter are generated by the web application layer proxy based on masking unmasked parameter values associated with the first parameter while preserving character lengths of the unmasked parameter values associated with the first parameter and character types of characters in the unmasked parameter values associated with the first parameter,
    determine whether a profile of the first parameter can be generated based on analyzing the masked parameter values associated with the first parameter,
    generate the profile of the first parameter in response to a determination that the profile of the first parameter can be generated based on analyzing the masked parameter values associated with the first parameter, wherein the profile of the first parameter indicates a parameter type of the first parameter that was learned based on analyzing the masked parameter values associated with the first parameter, and
    provide the profile of the first parameter to the web application layer proxy, wherein the web application layer proxy uses the profile of the first parameter to detect when future parameter values associated with the first parameter of future web application layer requests received by the web application layer proxy do not conform to the profile of the first parameter.

16. The network device of claim 15, wherein the instructions, when executed by the one or more processors, further causes the network device to:
  obtain masked parameter values associated with a second parameter of the web application layer requests, wherein the masked parameter values associated with the second parameter are generated by the web application layer proxy based on masking unmasked parameter values associated with the second parameter while preserving character lengths of the unmasked parameter values associated with the second parameter and character types of characters in the unmasked parameter values associated with the second parameter, determine whether a profile of the second parameter can be generated based on analyzing the masked parameter values associated with the second parameter,
send a request to the web application layer proxy to provide aggregated and shuffled parameter values associated with the second parameter in response to a determination that the profile of the second parameter cannot be generated based on analyzing the masked parameter values associated with the second parameter,
obtain the aggregated and shuffled parameter values associated with the second parameter, wherein the aggregated and shuffled parameter values associated with the second parameter are generated by the web application layer proxy based on aggregating unmasked parameter values associated with the second parameter and shuffling characters in the aggregated parameter values,
determine whether a profile of the second parameter can be generated based on analyzing the aggregated and shuffled parameter values associated with the second parameter,
generate the profile of the second parameter in response to a determination that the profile of the second parameter can be generated based on analyzing the aggregated and shuffled parameter values associated with the second parameter, and
provide the profile of the second parameter to the web application layer proxy, wherein the web application layer proxy uses the profile of the second parameter to detect when future parameter values associated with the second parameter of future web application layer requests received by the web application layer proxy do not conform to the profile of the second parameter.

17. The network device of claim 16, wherein the instructions, when executed by the one or more processors, further causes the network device to:
obtain masked parameter values associated with a third parameter of the web application layer requests, wherein the masked parameter values associated with the third parameter are generated by the web application layer proxy based on applying a deterministic masking function to unmasked parameter values associated with the third parameter, wherein the masked parameter values associated with the third parameter are used when analyzing the masked parameter values associated with the first parameter or analyzing the masked parameter values associated with the second parameter.

18. The network device of claim 17, wherein the deterministic masking function is an Advanced Encryption Standard (AES) encryption function.

19. The network device of claim 17, wherein the third parameter is an Internet Protocol (IP) address parameter or a Uniform Resource Locator (URL) parameter.

20. The network device of claim 15, wherein the character lengths of the unmasked parameter values associated with the first parameter and the character types of characters in the unmasked parameter values associated with the first parameter are preserved based on representing digits in the unmasked parameter values associated with the first parameter using a first designated character, representing letters in the unmasked parameter values associated with the first parameter using a second designated character, and representing special characters in the unmasked parameter values associated with the first parameter using a third designated character.

* * * * *